United States Patent
Dai et al.

(10) Patent No.: US 6,976,181 B2
(45) Date of Patent: Dec. 13, 2005

(54) METHOD AND APPARATUS FOR ENABLING A LOW POWER MODE FOR A PROCESSOR

(75) Inventors: Xia Dai, San Jose, CA (US); John W. Horigan, Mountain View, CA (US); Millind Mittal, Palo Alto, CA (US); Leslie E. Cline, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 10/027,939

(22) Filed: Dec. 20, 2001

(65) Prior Publication Data

US 2003/0120962 A1 Jun. 26, 2003

(51) Int. Cl.⁷ .............................. G06F 1/26; G06F 1/32
(52) U.S. Cl. ...................... 713/320; 713/300; 711/135
(58) Field of Search .......................... 713/320; 711/135

(56) References Cited

U.S. PATENT DOCUMENTS

| | | |
|---|---|---|
| 5,189,647 A | 2/1993 | Suzuki et al. |
| 5,481,731 A | 1/1996 | Conary et al. |
| 5,511,203 A | 4/1996 | Wisor et al. |
| 5,530,932 A | 6/1996 | Carmean et al. |
| 5,581,500 A | 12/1996 | D'Souza |
| 5,656,946 A | 8/1997 | Sim |
| 5,712,589 A | 1/1998 | Afek et al. |
| 5,761,715 A | 6/1998 | Takahashi |
| 5,784,628 A * | 7/1998 | Reneris ..................... 713/300 |
| 5,801,585 A | 9/1998 | Roohparvar |
| 5,970,007 A | 10/1999 | Shiratake |
| 6,031,782 A | 2/2000 | Kobashi et al. |
| 6,069,519 A | 5/2000 | Song |
| 6,163,044 A | 12/2000 | Manning |
| 6,333,571 B1 | 12/2001 | Teraoka et al. |
| 6,333,874 B2 | 12/2001 | Yamauchi |
| 6,347,379 B1 | 9/2002 | Dai et al. |
| 6,552,601 B1 | 4/2003 | Burr |
| 6,704,880 B2 | 3/2004 | Dai et al. |

FOREIGN PATENT DOCUMENTS

| | | | |
|---|---|---|---|
| JP | 11-353230 | 12/1999 | |
| JP | 411353230 A | * 12/1999 | ........... G06F/12/08 |

OTHER PUBLICATIONS

PCT Written Opinion for PCT International Application No. US02/40706, mailed Dec. 6, 2004, 3 pages.

International Search Report for International Application No. PCT/US02/40706, Attorney Docket No. P9738PCT, Aug. 8, 2004, 6 pages.

International Preliminary Examination Report for International Application No. PCT/US02/40706, Attorney Docket No. P9738PCT, Feb. 25, 2005, 6 pages.

Bellaouar, A. et al., *Supply Voltage Scaling for Temperature Insensitive CMOS Circuit Operation*, IEEE Transactions on Circuits and Systems–II: Analog and Digital Signal Processing, vol. 45, No. 3, Mar. 1998, pp. 415–417.

Dancy, Abram et al., *Techniques for Aggressive Supply Voltage Scaling and Efficient Regulation*, IEEE 1997 Custom Integrated Circuits Conferences, May 5–8 1997, pp. 579–586.

(Continued)

*Primary Examiner*—Lynne H. Browne
*Assistant Examiner*—Stefan Stoynov
(74) *Attorney, Agent, or Firm*—Cynthia T. Faatz

(57) ABSTRACT

In accordance with an embodiment of the present invention, a triggering event is initiated to place a processor in a low power state. The processor may or may not flush a cache upon entering the low power state depending on a power status signal. The power status signal may indicate the relative priority of power reduction associated with placing the processor in the low power state without first flushing the cache versus an increase in soft error rate in the cache associated with reducing the voltage in the low power state.

25 Claims, 3 Drawing Sheets

OTHER PUBLICATIONS

Gonzalez, Ricardo et al., *Supply and Thresold Voltage Scaling for Low Power CMOS*, IEEE Journal of Solid–State Circuits, vol. 32, No. 8, Aug. 1997, pp. 1210–1216.

Final Office Action for U.S. Appl. No. 09/161,076, Aug. 24, 2001, 10 pages.

Non–Final Office Action for U.S. Appl. No. 09/161,076, Apr. 23, 2001, 10 pages.

Non–Final Office Action for U.S. Appl. No. 09/161,076, Feb. 11, 2000, 14 pages.

Non–Final Office Action for U.S. Appl. No. 09/978,644, Jan. 30, 2003, 6 pages.

Corrected Notice of Allowance for U.S. Appl. No. 09/978,644, Dec. 11, 2003, 11 pages.

IBM Corporation, *Leakage Current Reduction/Minimization through Substrate and/or Well Bias Control Coupled with Clock Power Management*, IBM Technical Disclosure Bulletin, vol. 41, No. 1, Jan. 1998, pp. 547–549.

\* cited by examiner

METHOD AND APPARATUS FOR ENABLING A LOW POWER MODE FOR A PROCESSOR

The present invention relates to computer systems and more particularly to reducing the amount of power consumed by an electronic device, such as a processor, in a low power state.

BACKGROUND

Computer systems are becoming increasingly pervasive in our society, including everything from small handheld electronic devices, such as personal data assistants and cellular phones, to application-specific electronic components, such as set-top boxes and other consumer electronics, to medium-sized mobile and desktop systems to large workstations and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a triggering event is initiated to place a processor in a low power state. To reduce leakage in this low power state, the voltage supplied to the processor may be lowered, including the voltage supplied to the L2 cache of the processor. Lowering the voltage to the L2 cache may subject the cache to an increased soft error rate (SER). A soft error occurs when a bit is set to a particular value in the processor and spontaneously changes to the opposite value (e.g. from a logical "1" to a logical "0", or vice-versa), thereby corrupting the associated data. A soft error may be caused by cosmic rays passing through a storage element within the processor, charging or discharging the storage element, thereby causing a stored bit to change its value.

In accordance with an embodiment of the present invention, the processor may or may not flush the L2 cache upon entering the low power state depending on a power status signal. The power status signal may indicate the relative priority of power reduction associated with placing the processor in the low power state without first flushing the L2 cache versus an increase in SER in the L2 cache associated with the voltage reduction in the low power state. The power status signal may also indicate if the computer system is to enter a suspend state.

A more detailed description of embodiments of the present invention, including various configurations and implementations, is provided below.

As used herein, the term "while" is intended to mean during all or some portion of time within the period of time that satisfies a condition. For example, the statement "event 'A' occurs while event 'B' occurs" is intended to mean that event A may occur during all or some portion of the period of time during which event B occurs.

Also, as used herein, the term "upon" is intended to mean before, after, or during the occurrence of an associated event. For example, the statement "event 'A' occurs upon the occurrence of event 'B'" is intended to mean that event 'A' may occur before, after, or during the occurrence of event 'B', but is nevertheless associated with the occurrence of event 'B'. As a more specific example, "a processor cache is flushed upon entering a low power state" means that the contents of the cache may be flushed before, after, or during the transition to the low power state, and this flush is associated with the low power state transition. "Contents of a cache are maintained upon entering a low power state" means that the contents of the cache may be maintained while the processor is in the low power state. Note that no distinction is made between flushing a cache and flushing contents of a cache. Further note that "contents" may include all or only a portion of the total contents of the cache.

Figure 1:
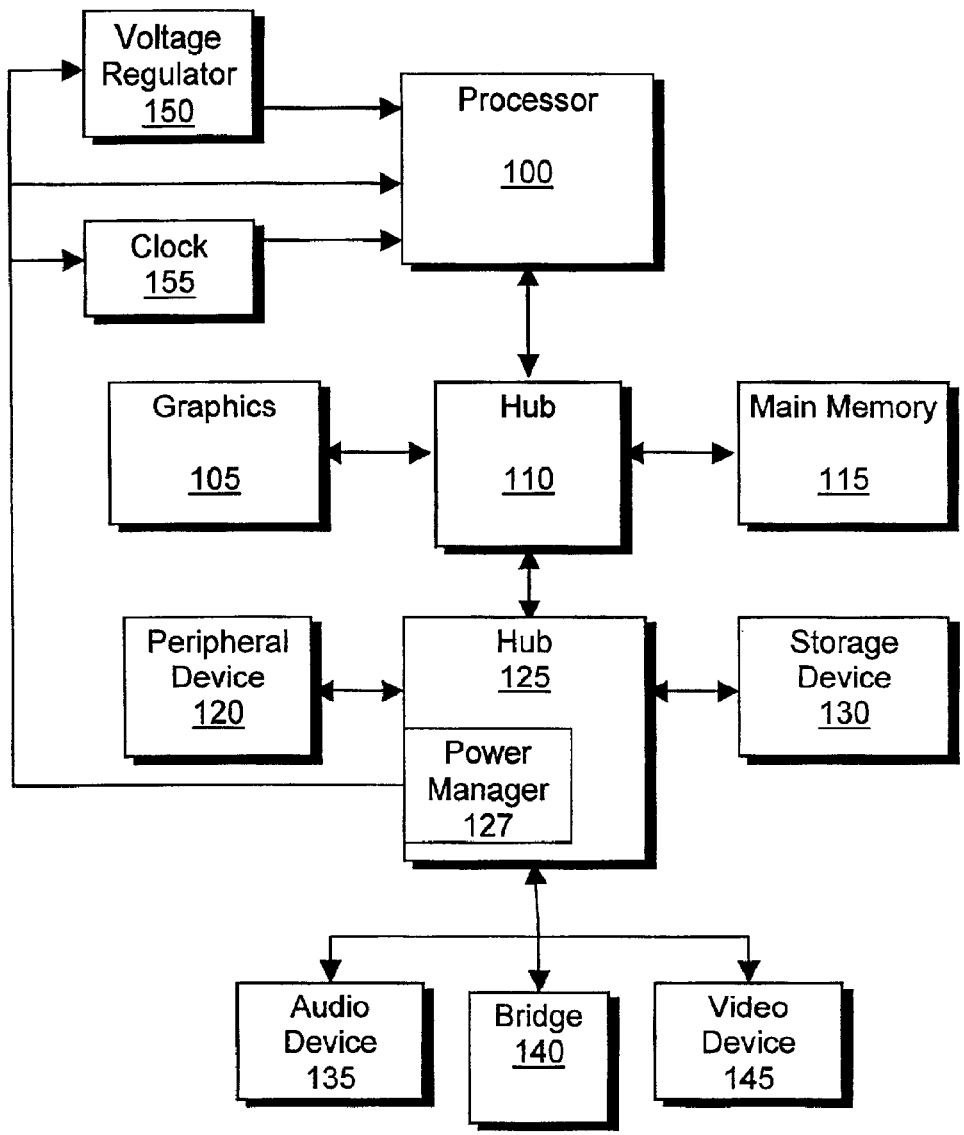
FIG. 1 includes a computer system formed in accordance with an embodiment of the present invention.

FIG. 1 includes a computer system that may be formed in accordance with an embodiment of the present invention. As shown, the computer system may include a processor 100 coupled to hub 110. Processor 100 may be powered by one or more voltages from voltage regulator 150, and clock 155 may provide a clock signal to processor 100. Processor 100 may communicate with graphics controller 105, main memory 115, and hub 125 via hub 110. Hub 125 may couple peripheral device 120, storage device 130, audio device 135, video device 145, and bridge 140 to hub 110.

Audio device 135 may include, for example, a speaker, a microphone, or other input/output device. Video device 145 may include, for example, a display screen, camera, or other video input/output device. Bridge 140 may couple hub 125 to one or more additional buses coupled to one or more additional peripheral devices. Peripheral device 120 may be one or more other peripheral devices. Note that in accordance with alternate embodiments of the present invention, a computer system may include more or fewer devices than those shown in FIG. 1, and the devices of FIG. 1 may be partitioned differently.

Note that a method of an embodiment of the present invention may be implemented by the computer system of FIG. 1 programmed to execute various steps of the method. This program may reside, at least in part, in any machine-readable medium such as a magnetic disk (e.g. a hard drive or floppy disk), an optical disk (e.g. a CD or DVD), a semiconductor device (e.g. Flash, EPROM, or RAM), or a carrier wave (e.g. an electrical or wireless data signal), all of which are collectively represented by storage device 130 of FIG. 1.

Hub 125 of FIG. 1 includes a power manager 127. Power manager 127 may send power status signals to voltage regulator 150, processor 100 and clock 155. These power status signals may be in accordance with the Advanced Configuration and Power Interface Specification, Rev. 2.0, published Jul. 27, 2000. These power status signals may indicate the power states of one or more components of the computer system. In accordance with an alternate embodiment of the present invention, power manager 127 may reside within a different component of the computer system (such as within hub 110 or processor 100), may be a discrete component, or may be distributed among multiple components of the computer system.

Figure 2:
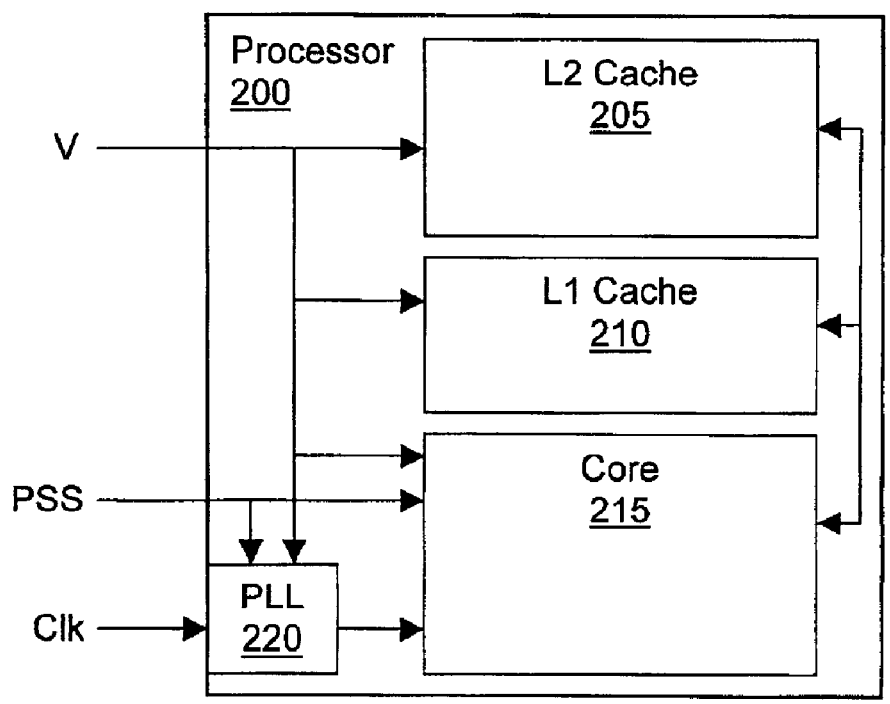
FIG. 2 includes a processor formed in accordance with an embodiment of the present invention.

FIG. 2 includes a processor formed in accordance with an embodiment of the present invention. In accordance with one embodiment of the present invention, processor 200 may be implemented as processor 100 of FIG. 1, or, alternatively, processor 200 may be another device such as a graphics controller (also to be encompassed under the generic term "processor" as used herein). As shown, processor 200 includes one or more voltage supply input ports to receive one or more voltages from one or more voltage regulators (such as voltage regulator 150 of FIG. 1). Voltage is provided to L2 cache 205, L1 cache 210, core 215, and phase locked loop (PLL) 220 to power these components. Core 215 of FIG. 2 may include a pipeline of processor 200, including execution units and registers for executing instructions.

In accordance with one embodiment of the present invention, processor 200 of FIG. 2 may additionally include one or more power status signal (PSS) ports to receive a power status signal (which may include one or more individual signals) from an external source such as from power manager 127 of FIG. 1. The PSS port may be coupled to PLL 220 and core 215 to provide the power status signal to these components of processor 200. In accordance with an alternate embodiment of the present invention, the power status signal may be generated internally, e.g. within core 215 of processor 200, and provided to components of processor 200. The power status signal may be internally generated based on, for example, data provided to processor 200 and stored in one or more registers of processor 200.

In accordance with one embodiment of the present invention, processor 200 of FIG. 2 may include a clock (clk) input port to receive one or more clock signals from an external clock generator such as clock 155 of FIG. 1. The clock signal may be provided to core 215 via PLL 220 (which may serve to multiply its frequency). Note that the clock to the core may be on or off depending not only on whether or not PLL 220 provides the clock signal to core 215 but also on whether or not the external clock source, such as clock 155, provides the clock signal to PLL 220.

Figure 3:
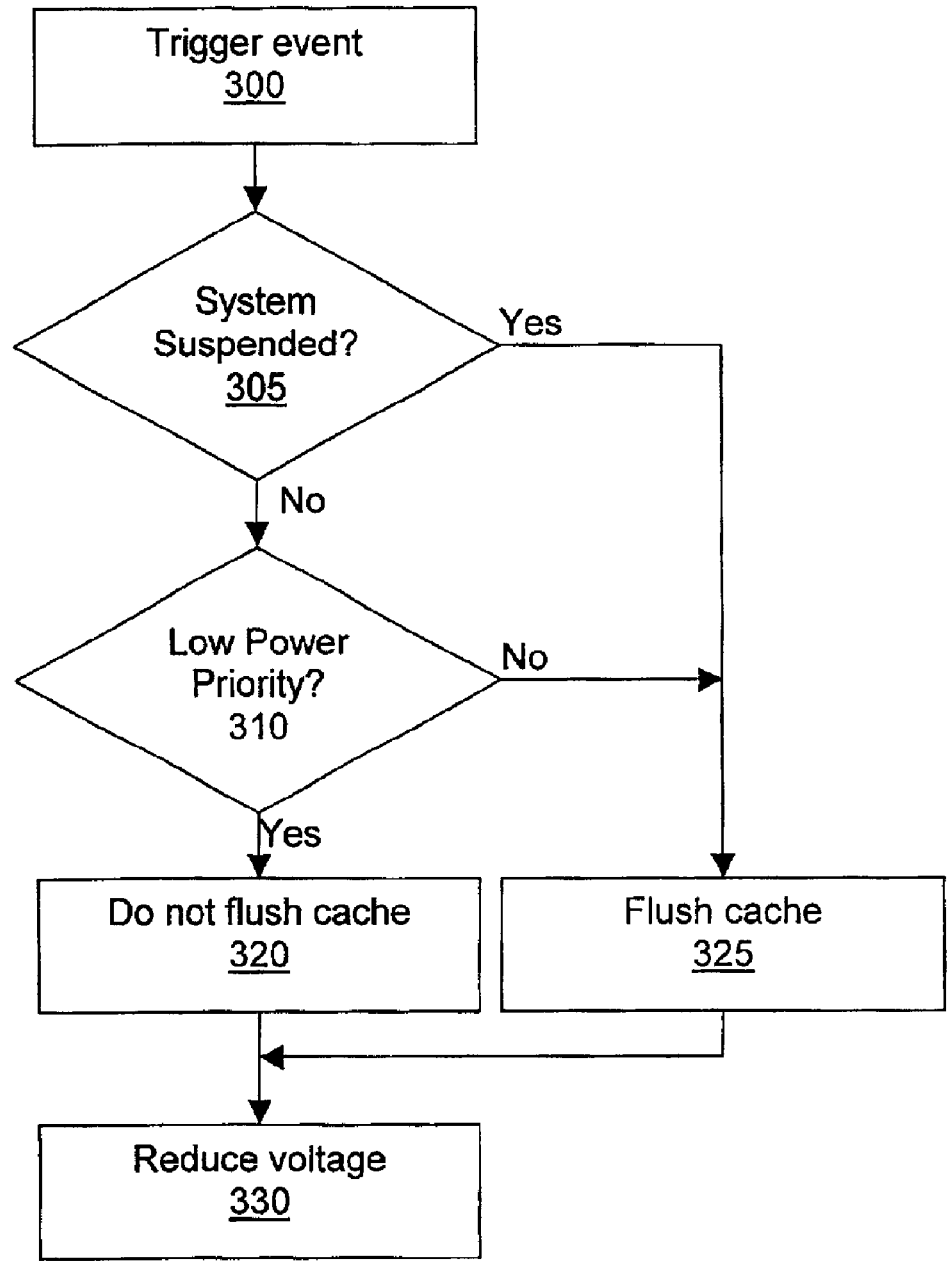
FIG. 3 includes a flow chart showing a method of the present invention.

FIG. 3 includes a flow chart showing a method of the present invention. In accordance with one embodiment of the present invention, the method of FIG. 3 may be implemented on the computer system of FIG. 1 including the processor of FIG. 2.

At step 300 of FIG. 3, an event occurs that triggers the processor to transition into a low power state. This triggering event may be a request by a user such as, for example, when a user presses a "sleep" or "suspend" button on a computer system. The triggering event may alternatively be the execution by the computer system of an instruction that requests a transition to a low power state. Alternatively, the triggering event may be initiated by the computer system upon detecting inactivity of the computer system for a timeout period.

In response to the triggering event that occurs at step 300 of FIG. 3, a particular power status signal (which may include one or more individual signals) may be sent from power manager 127 of FIG. 1. This power status signal may be used by various components of the computer system, such as one or more voltage regulators, the clock, and one or more processors, to place the system in the desired low power state.

At step 305 of FIG. 3 it may be determined if the computer system is to be placed in a suspend state. In accordance with one embodiment of the present invention, a suspend state may be an S1, S2, S3, S4, S5 or any other system states other than an S0 state, as defined by ACPI. The suspend state may alternatively be referred to as a sleeping state or non-working state. Determination as to whether or not the system is to be placed in a suspend state may depend on the triggering event at step 300, the current state of the system, or both. In accordance with one embodiment of the present invention, determination as to whether or not the system is to be suspended (or, if already suspended, whether or not the system is to remain suspended) may be indicated by the power status signal.

In accordance with an embodiment of the present invention, if, at step 305 of FIG. 3, it is determined that the computer system is to be suspended, then at step 325 the cache of the processor is flushed. In accordance with one embodiment of the present invention, the cache that is flushed may include the L1 cache, the L2 cache, or both. In accordance with alternate embodiments of the present invention, alternate cache levels may be implemented in a processor, and one or more of these caches may be flushed at step 325.

By flushing the cache at step 325 of FIG. 3, the integrity of the contents of the cache (data) may be better maintained during the low power state in which the voltage supplied to the cache is reduced (to be described in more detail below). This is because the SER in the cache increases when the voltage supplied to the cache is reduced, thereby reducing the integrity of any data stored in therein. Unfortunately, maintaining the integrity of the cache data by flushing it at step 325 may come at a cost.

This cost is the latency associated with flushing the cache upon entering the low power state, and reloading the cache after the processor exits the low power state. Due to this latency, a processor that flushes its cache upon entering a low power state may spend less time in that low power state than if its cache is not flushed upon entering the low power state. As a result, the average power consumed by the processor that flushes its cache upon entering the low power state may be greater than the average power consumed by the processor that does not flush its cache upon entering the low power state. In accordance with an embodiment of the present invention, a balance is struck between the priorities of maintaining data integrity by flushing a cache and reducing power consumption by not flushing the cache.

In accordance with an embodiment of the present invention, the cache is flushed at step 325 if it is determined that the computer system is to be suspended at step 305 of FIG. 3 because the latency associated with flushing the cache may be hidden by the latency associated with suspending (and later waking) the system. If, however, it is determined that the system is not to be suspended at step 305, then the priority of low power operation versus data integrity is determined at step 310.

In accordance with an embodiment of the present invention, the power savings associated with flushing versus not flushing the cache is balanced against the data integrity associated with increasing the SER in the cache by reducing its voltage. If, at step 310 of FIG. 3, it is determined that the power reduction associated with not flushing the cache is a lower priority than avoiding the increase in the SER in the cache associated with reducing the voltage to the cache, then the cache is flushed at step 325. In other words, if it is determined at step 310 that low power operation of the system is not the priority versus data integrity associated with the SER, then the cache is flushed at step 325.

In accordance with one embodiment of the present invention, low power operation of the computer system may be determined to be a lesser priority than data integrity associated with the SER at step 310 of FIG. 3 if, for example, the system is powered by an electrical power outlet. This determination may be made in accordance with the power status signal. For example, for one embodiment of the present invention, the power status signal may include a signal to indicate whether or not the computer system is powered by an electrical power outlet or a battery.

If, at step 310 of FIG. 3, it is determined that the power reduction associate with not flushing the cache is a higher priority than avoiding the increase in the SER in the cache associated with reducing the voltage to the cache, then the cache is not flushed at step 320. In other words, if it is determined at step 310 that low power operation of the system is a higher priority than data integrity associated with the SER, then the cache is not flushed (i.e. the contents of the cache are maintained) at step 320. In accordance with one embodiment of the present invention, the cache that is not flushed includes both the L1 cache and the L2 cache. Alternatively, the cache that is not flushed may be only the L1 or L2 cache. In accordance with alternate embodiments of the present invention, alternate cache levels may be implemented in a processor, and the contents of one or more of these caches may be maintained at step 320.

In accordance with one embodiment of the present invention, low power operation of the computer system may be determined to be a higher priority than data integrity associated with the SER at step 310 of FIG. 3 if, for example, the system is powered by a battery. This determination may be made in accordance with the power status signal. For example, for one embodiment of the present invention, the power status signal may include a signal to indicate whether or not the computer system is powered by an electrical power outlet or a battery.

For another embodiment, the power status signal may include a signal to indicate whether or not low power operation has been requested, either directly or indirectly, by the computer system user. For this embodiment, low power operation may be determined to be a higher priority than data integrity associated with the SER at step 310 of FIG. 3, and the cache contents may accordingly be maintained at step 320. For yet another embodiment of the present invention, the power status signal may include a signal to indicate that a thermal trip point has been reached and the processor is to be cooled. For this or other embodiments in which cooler operation of the processor is desired, low power operation may be determined to be a higher priority than data integrity associated with the SER at step 310, and the cache contents may accordingly be maintained at step 320.

At step 330 of FIG. 3, voltage to the cache or caches of step 320 or 325 may be reduced. In accordance with one embodiment of the present invention, the clock to the processor core is also stopped so that the clock is off while the processor is in the low power state. In accordance with one embodiment of the present invention, voltage to the cache is reduced along with the voltage to other components of the processor. For example, as shown in FIG. 2, the voltage that powers L2 cache 205, L1 cache 210, processor core 215, and PLL 220 may be reduced. Reducing the voltage reduces the leakage current in the processor, thereby reducing the power consumption of the processor.

In accordance with one embodiment of the present invention, the voltage level may be reduced at step 330 to a voltage level that is less than twice the average threshold voltage of a majority of transistors of the processor. This voltage level may be found to significantly reduce leakage current while maintaining an acceptable SER. For one embodiment of the present invention, after the clock is stopped and the voltage is reduced at step 330, the processor is in the low power state. Upon exiting the lower power state, the voltage level may be raised to the initial operating level and the cache lines of flushed caches may be invalidated.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
   a voltage supply input port to receive a voltage at a first voltage level; and
   a cache to flush or maintain its contents, depending on a power status signal and an indication of whether a power reduction associated with maintaining the contents of the cache upon entering the low power state is a lower priority than avoiding an increase in a soft error rate in the cache associated with reducing the voltage to the second voltage level, upon entering a low power state in which the voltage is to be received at a second voltage level, the second voltage level being lower than the first voltage level.

2. The processor of claim 1, wherein the voltage supply input port is coupled to the cache to power the cache, and the second voltage level is less than twice an average threshold voltage of a majority of transistors of the processor.

3. The processor of claim 1, further comprising:
   a power status signal port to receive the power status signal from an external source; and
   a core to receive the power status signal and to flush or maintain the contents of the cache depending on the power status signal.

4. The processor of claim 1, further comprising a core to generate the power status signal and to flush or maintain the contents of the cache depending on the power status signal.

5. The processor of claim 1, further comprising:
   a core to execute instructions; and
   a phase locked loop to provide a clock signal to the core, the clock signal to be off during the low power state.

6. The processor of claim 1, wherein the cache is an L1 cache, an L2 cache, or both.

7. The processor of claim 1, wherein the cache is to flush its contents upon entering the low power state if the power status signal indicates that a system in which the processor resides is to be suspended.

8. The processor of claim 1, wherein the cache is to flush its contents upon entering the low power state if the power status signal indicates that power reduction associated with maintaining the contents of the cache upon entering the low power state is a lower priority than avoiding an increase in a soft error rate in the cache associated with reducing the voltage to the second voltage level.

9. The processor of claim 8, wherein the power status signal indicates that power reduction associated with maintaining the contents of the cache upon entering the low power state is a lower priority than avoiding an increase in a soft error rate in the cache associated with reducing the voltage to the second voltage level if the power status signal indicates that the voltage is being provided by an electrical power outlet.

10. The processor of claim 1, wherein the cache is to maintain its contents upon entering the low power state if the power status signal indicates that power reduction associated with maintaining the contents of the cache upon entering the low power state is a higher priority than avoiding an increase in a soft error rate in the cache associated with reducing the voltage to the second voltage level.

11. The processor of claim 10, wherein the power status signal indicates that power reduction associated with maintaining the contents of the cache upon entering the low power state is a higher priority than avoiding an increase in a soft error rate in the cache associated with reducing the voltage to the second voltage level if the power status signal indicates that the voltage is being provided by a battery.

12. A computer system comprising:
    a voltage regulator to supply a voltage at a first voltage level and to supply the voltage at a lower second voltage level while in a low power state;
    a cache, to be powered by the voltage from the voltage regulator; and
    a power manager to send a first or second signal if power reduction associated with maintaining contents of the cache upon entering the low power state is a lower or higher priority, respectively, than avoiding an increase in a soft error rate in the cache associated with the low power state.

13. The computer system of claim 12, wherein the cache is to flush or maintain its contents if the processor receives the first or second signal, respectively, upon entering the low power state.

14. The computer system of claim 13, further comprising a clock to provide a clock signal to a core of a processor containing the cache, the clock signal to the core to be off during the low power state.

15. The computer system of claim 13, wherein the second voltage level is less than twice an average threshold voltage of a majority of transistors of the cache.

16. The computer system of claim 12, wherein the second voltage level is less than twice an average threshold voltage of a majority of transistors of the cache.

17. A computer system comprising:
    a voltage regulator to supply a voltage;
    a clock to provide a clock signal; and
    a processor to receive the clock signal and the voltage, the processor including a cache, the processor to flush or maintain contents of the cache, depending on a power status signal and an indication of whether a power reduction associated with maintaining the contents of the cache upon entering the low power state is a lower priority than avoiding an increase in a soft error rate in the cache associated with reducing the voltage to the second voltage level, upon entering a low power state in which the clock is off and the voltage is reduced.

18. The computer system of claim 17, wherein the voltage regulator is to supply the voltage at a voltage level that is less than twice an average threshold voltage of a majority of transistors of the cache during the low power state.

19. The computer system of claim 17, wherein the voltage regulator is to supply the voltage to the processor at a reduced voltage level during the low power state, and the cache is to flush its contents upon entering the low power state if the power status signal indicates that the computer system is to be suspended.

20. The computer system of claim 19, wherein the cache is to maintain its contents upon entering the low power state if the power status signal indicates that the voltage is being provided by a battery.

21. The computer system of claim 20, wherein the cache is to flush its contents upon entering the low power state if the power status signal indicates that the voltage is being provided by an electrical power outlet.

22. A method comprising:
    triggering a processor of a computer system to enter a low power state in which a voltage supplied to a cache of the processor is reduced and a clock supplied to the processor is off; and
    flushing or maintaining contents of the cache upon entering the low power state depending on a power status signal and an indication of whether a power reduction associated with maintaining the contents of the cache upon entering the low power state is a lower priority than avoiding an increase in a soft error rate in the cache associated with reducing the voltage to the second voltage level.

23. The method of claim 22, further comprising flushing the contents of the cache upon entering the low power state if the computer system is to be suspended.

24. A tangible machine-readable medium including machine-readable instructions that, if executed by a machine, cause the machine to perform the method of claim 22.

25. A tangible machine-readable medium including machine-readable instructions that, when executed by a machine, cause the machine to perform the method of claim 23.

* * * * *